US006560270B1

(12) United States Patent
Hischke

(10) Patent No.: US 6,560,270 B1
(45) Date of Patent: May 6, 2003

(54) METHOD FOR TUNING A SPREAD SPECTRUM RECEIVER

(75) Inventor: Mark D. Hischke, Algonquin, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/262,800

(22) Filed: Mar. 4, 1999

(51) Int. Cl.[7] ................................................ H04B 1/69
(52) U.S. Cl. ...................................................... 375/136
(58) Field of Search ............................... 375/130, 136, 375/206, 134, 344, 345; 330/132; 331/1 R, 7, 10, 2; 455/77, 193, 75, 184.1, 136, 150.1, 160.1, 161.1, 173.1, 182.3, 188.1, 191.1, 192.3; 340/870.2; 370/342, 350

(56) References Cited

U.S. PATENT DOCUMENTS

| | | | | |
|---|---|---|---|---|
| 4,621,365 A | | 11/1986 | Chiu | 375/1 |
| 4,644,523 A | | 2/1987 | Horwitz | 370/18 |
| 4,704,585 A | | 11/1987 | Lind | 331/14 |
| 4,862,516 A | * | 8/1989 | Macnak et al. | 455/193.1 |
| 5,018,088 A | | 5/1991 | Higbie | 364/574 |
| 5,390,348 A | | 2/1995 | Magin et al. | 455/63 |
| 5,438,329 A | * | 8/1995 | Gastouniotis et al. | 340/870.02 |
| 5,487,186 A | * | 1/1996 | Scarpa | 455/192.2 |
| 5,598,441 A | | 1/1997 | Kroeger et al. | 375/344 |
| 5,640,431 A | | 6/1997 | Bruckert et al. | 375/344 |
| 5,982,823 A | * | 11/1999 | Jacklin | 375/344 |
| 5,999,561 A | * | 12/1999 | Naden et al. | 375/206 |
| 6,044,074 A | * | 3/2000 | Zehavi et al. | 370/350 |
| 6,144,843 A | * | 11/2000 | Kianush et al. | 455/193.1 |
| 6,157,260 A | * | 12/2000 | Tilley et al. | 331/2 |
| 6,282,184 B1 | * | 8/2001 | Lehman et al. | 370/342 |

* cited by examiner

*Primary Examiner*—Emmanuel Bayard
(74) *Attorney, Agent, or Firm*—Stetina Brunda Garred & Brucker

(57) ABSTRACT

A method for tuning spread spread spectrum receivers to a frequency of a digital signal within a specified frequency band as the steps of coarse tuning the receiver while a preamble of the digital signal is being received, fine tuning the receiver while the preamble of the digital signal is being received, and demodulating the signal. Preferably, the step of coarse tuning the receiver comprises dividing the specified frequency band into a plurality of first sub-bands, and sequentially measuring a receive signal strength within each of the sub-bands until a receive signal strength is greater than a predetermined threshold. Preferably, the step of fine tuning the receiver comprises the dividing at least one first step-band which is found to have a receive signal strength greater than a predetermined threshold into a plurality of second sub-bands when a receive signal strength is greater than the predetermined threshold, sequentially measuring a receive signal strength within each sub-band so as to determine which second sub-band contains a signal having a receive signal strength above a predetermined threshold, and determining which second sub-band contained the signal with the greatest receive signal strength.

7 Claims, 3 Drawing Sheets

METHOD FOR TUNING A SPREAD SPECTRUM RECEIVER

FIELD OF THE INVENTION

The present invention relates generally to digital data communications and more particularly to a method for tuning a spread spectrum receiver to the frequency of a digital signal which is within a specified frequency band.

BACKGROUND OF THE INVENTION

Spread spectrum digital communications techniques are well known. Such spread spectrum digital communications techniques provide a means for facilitating low power radio communications, increased bandwidth usage, and in many instances provide a low cost means for complying with Federal Communications Commission (FCC) regulations.

One such spread spectrum technique is Direct Sequence Spread Spectrum (DSSS) which utilizes burst transmissions. This is a phase modulation technique wherein the transmission phase of the message changes rapidly, perhaps every few microseconds.

Generally a communication system is designed so that both transmitter and receiver operate at precisely the same frequency. However, in less expensive systems it may not be possible to fix the frequency accurately enough to permit reception. In this instance, it will be necessary for the receiver to quickly tune to the frequency of the transmitted signal, so as to facilitate the modulation of the message before the transmission burst finishes.

In view of the forgoing, it would be desirable to provide a method for tuning a spread spectrum receiver to the frequency of the desired digital signal which is known to be located within a specific frequency band.

SUMMARY OF THE INVENTION

The present invention specifically addresses and alleviates the above mentioned deficiencies associated with the prior art. More particularly, the present invention provides a method for tuning a spread spectrum receiver to a frequency of a digital signal within a specified frequency band. The method generally comprises the steps of coarse tuning the receiver while a preamble of the digital signal is being received, then fine tuning the receiver while the preamble of the digital signal is still being received, and then demodulating the signal after the frequency thereof has been determined via such coarse and fine tuning.

According to the preferred embodiment of the present invention, the step of coarse tuning the receiver comprises dividing the specified frequency band into a plurality of sub-bands, and sequentially measuring a received signal strength within each first sub-band until a received signal strength is greater than a predetermined threshold.

According to the preferred embodiment of the present invention, the step of fine tuning the receiver preferably comprises dividing at least one first sub-band which was found above to have a receive signal strength greater than a predetermined value into a plurality of second sub-bands when a receive signal strength is greater than the predetermined threshold. This process is repeated as necessary. Thus, when the first one of the first sub-bands having a receive signal greater than a predetermined threshold is not found to contain the frequency of the digital signal, then the next first sub-band having a receive signal strength greater than the predetermined threshold is divided into second sub-bands. In this manner, each first sub-band is divided into second sub-bands and checked for the frequency of the digital signal until the frequency of the digital signal is found, as discussed in detail below.

After a first sub-band has been divided into a plurality of second sub-bands, then the receive signal strength within each second sub-band is sequentially measured so as to determine which second sub-band contains the signal having a receive signal strength above a predetermined threshold.

Since, as those skilled in the art will appreciate, a plurality of the second sub-bands may have a receive signal strength greater than the predetermined threshold, according to the present invention that second sub-band which contains the greatest received signal strength is determined to contain the desired frequency of the digital signal. Thus, that second sub-band which has the greatest received signal strength is de-modulated.

As discussed above, two different methods are utilized in the selection of the desired first sub-band and the selection of the desired second sub-band. Selection of the desired first sub-band is performed by selecting the first sub-band having a receive signal strength greater than predetermined threshold and then the next first sub-band having a receive signal strength greater than the predetermined threshold is assumed to contain the frequency of the desired frequency of the digital signal. This process is continued until that first sub-band which actually contains the desired frequency of the digital signal is found.

By way of contrast, determination of the second sub-band (which is contained within one of the first sub-bands) is performed merely by selecting that second sub-band having the highest received signal strength. While this procedure avoids the interactive process used to determine which second sub-band contains the desired frequency of the digital signal, this simplified procedure can not be utilized efficiently to determine the desired first sub-band, since the greater band width of the set of first sub-bands make it much more likely that an undesirable signal will have a greater amplitude than the desired digital signal, thereby increasing the probability that one of the first sub-bands, other than the desired first sub-band, will contain the highest receive signal strength. That is, the increased band width of the set of first sub-bands makes it likely that selection of the first sub-band by utilizing the greatest signal contained within any of the first sub-bands will provide a false indication.

According to the preferred embodiment of the present invention the step of sequentially measuring a receive signal strength within each first sub-band comprises averaging a plurality of separate receive signal strength measurements within each sub-band.

According to the preferred embodiment of the present invention, the method for tuning a spread spectrum receiver to a frequency of a digital signal within a specified frequency band further comprises the step of verifying the second sub-band by demodulating at least a portion of the preamble of the digital signal.

The step of fine tuning the receiver preferably comprises fine tuning the receiver to within a frequency band which is small enough for an automatic frequency control circuit to pull the frequency of the digital signal within its control. Thus, the automatic frequency control circuit can then pull in and maintain the frequency of the digital signal.

The demodulization process preferably comprises demodulating a preamble of the signal in the second sub-band which has the greatest receive signal strength, demodulating frame synchronization data associated with that preamble, demodulating error detection coding associated with that preamble, demodulating a message length associated with that preamble, and finally, demodulating the message itself.

Thus, according to the present invention, a method for tuning a spread spectrum receiver to a frequency of a digital signal within a specified frequency band is provided.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

DSSS Receiver for Transmissions at Unknown Frequencies

Introduction

This description addresses reception of Direct Sequence Spread Spectrum (DSSS) burst transmissions when the transmissions occur at unknown frequencies. The transmission frequency is bounded to a specific bandwidth, but can occur randomly within that bandwidth. Although the transmissions occur at random frequencies, the transmit frequency is relatively constant for an individual burst.

Problem Description

A DSSS receiver must be tuned within $\pm\Delta f$ of a DSSS transmission frequency, $f_c$, to accurately demodulate the transmission. Frequently, $\Delta f$ is one quarter the data rate, $f_d/4$, and represents the maximum frequency deviation from which an Automatic Frequency Control (AFC) loop can tune. If the transmission frequency is unknown at the receiver and is likely to have deviation greater than $\pm\Delta f$ from $f_c$, then the receiver must first estimate the transmission frequency and tune to that frequency prior to demodulating the message. In this application, transmitter cost constraints must be evaluated in relation to frequency uncertainty, i.e., likelihood that frequency deviation exceeds $\pm\Delta f$.

It is often desirable to minimize the time required to perform the frequency estimate. When the frequency estimate is correctly known, the receive can start decoding the message. Present embodiments of the receiver were capable of accurate frequency estimation in less than 100 ms.

Good performance for signals near the theoretical noise floor is desirable to maximize the range coverage of the receiver. Therefore, the frequency estimation should preferably perform well with low signal-to-noise ratios (SNR).

In practice, the receiver may be further constrained to operate on post-detection data of uncertain quality. In such cases it may be desirable to buffer the pre-detection sampled data for faster processing approaches.

It should be understood that in the embodiment described below the transmitted message formats were known by the receiver. The PN Code was known. Each data bit was modulated by the entire PN Code.

Approach

Figure 1:
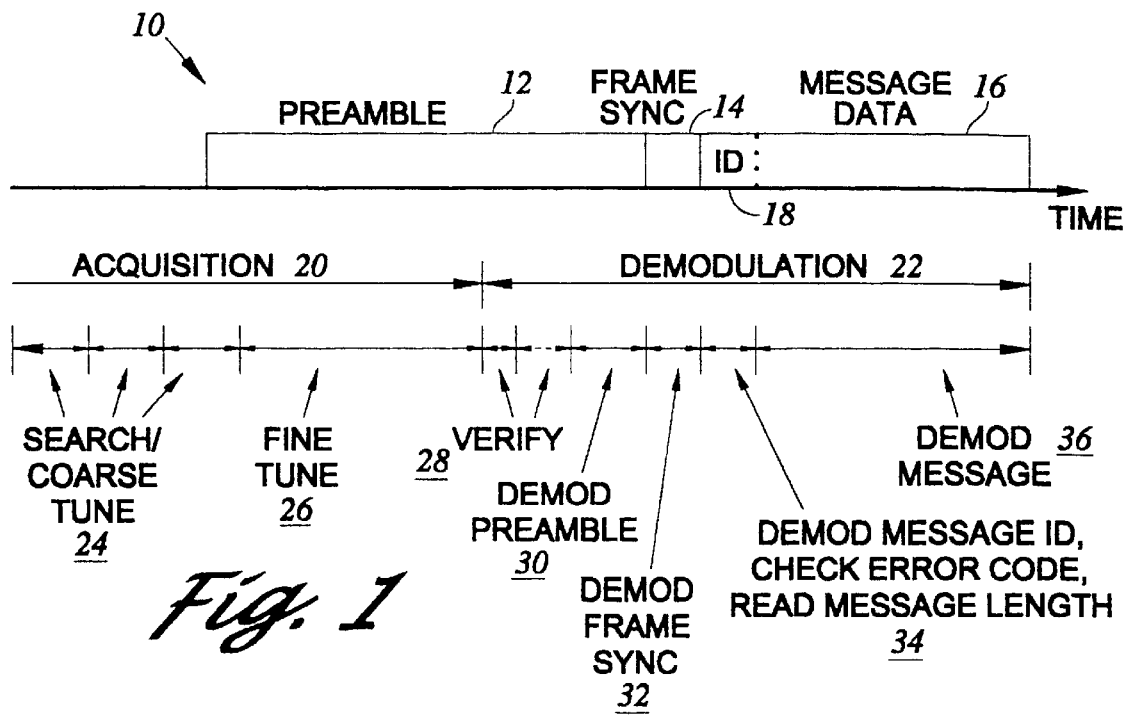
FIG. 1 shows a typical burst message structure and algorithm timing according to the present invention.

Referring now to FIG. 1, typical burst message structure and algorithm timing are shown. The DSSS Receive function is split into two sub functions: the acquisition algorithm and demodulation algorithm. Each of these algorithms is comprised of sub-functions.

Acquisition Algorithm

The acquisition algorithm scans the environment for burst transmissions that can occur at random frequencies and at random times. It detects any transmission and estimates that transmission's frequency. False alarms and time spent looking at false alarms are preferably minimized. The algorithm performs detection and frequency estimation with Search/Coarse Tune and Fine Tune functions.

Post-detection Received Signal Strength (RSS) data may be used as a discriminant to perform the algorithm.

Search/Coarse Tune

Figure 2:
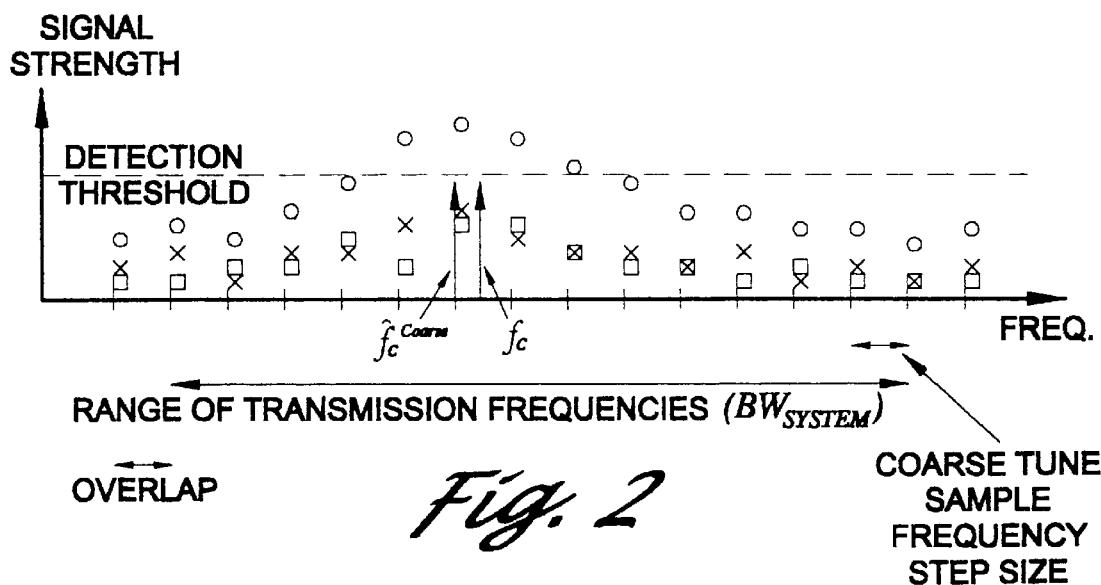
FIG. 2 shows search/coarse tuning method of the present invention wherein the specified frequency band within which the desired frequency of the digital signal is known to be has been divided into a plurality of first sub-bands.
Figure 3:
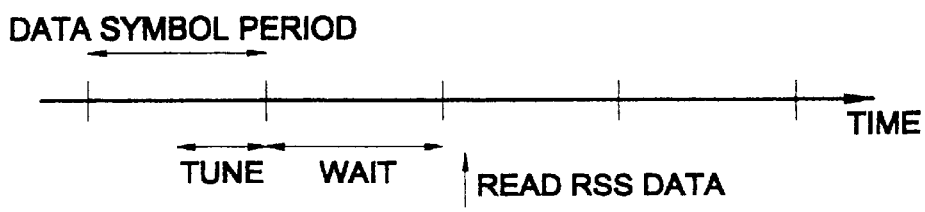
FIG. 3 shows the tuning step timing of the present invention.

Referring now to FIG. 2, the search/coarse tune function sweeps across the system frequency bandwidth ($BW_{system}$) looking for Received Signal Strength (RSS) above a specified detection threshold. Its objective is signal detection and coarse $f_c$ estimation. The sweep process consists of tuning to a frequency, waiting for a data symbol to be completely received, measuring the RSS value, and then repeating the entire process for the next frequency. FIG. 3 shows the timing for an individual tuning step.

In some cases an individual RSS measurement can be uncertain or noisy. Averaging several RSS measurements reduces the standard deviation of the RSS values. The averaging can be performed in two ways: 1) the curve shown in FIG. 2 can be smoothed by averaging adjacent values, and 2) the RSS value certainty at each frequency can also be improved by averaging several measurements at that same frequency. This algorithm employed both techniques.

Smoothing the curve highlights the trend of the transmission frequency. It eliminates nulls that may occur close to the actual transmission frequency due to the PN Code correlating poorly at a specific frequency. (In this application the curve was smoothed by sweeping from lower to higher frequency. A fixed length window of the adjacent lower frequency RSS values was used to smooth the current frequency RSS value. This introduced a bias in the coarse frequency estimate that had to be removed prior to proceeding to the Fine Tune stage of the Acquisition algorithm.)

Averaging several RSS values at a specific frequency reduces the combined estimate's RMS error. However, the error is reduced only if the measurements are not correlated. Using RSS measurements from consecutive data symbols is less desirable than using measurements from data symbols that are separated in time, because adjacent data symbols are more likely to be correlated.

Fine Tune

When a detection is declared in the Search/Coarse Tune function, the receiver proceeds with the Fine Tune function. This function must estimate the transmission frequency, $f_c$, to within $\pm\Delta f$ of $f_c$. It performs sweeps over a narrower frequency range than specified in the Search Coarse Tune function. However, its frequency steps are much smaller than those in the Search/Coarse Tune function.

Figure 4:
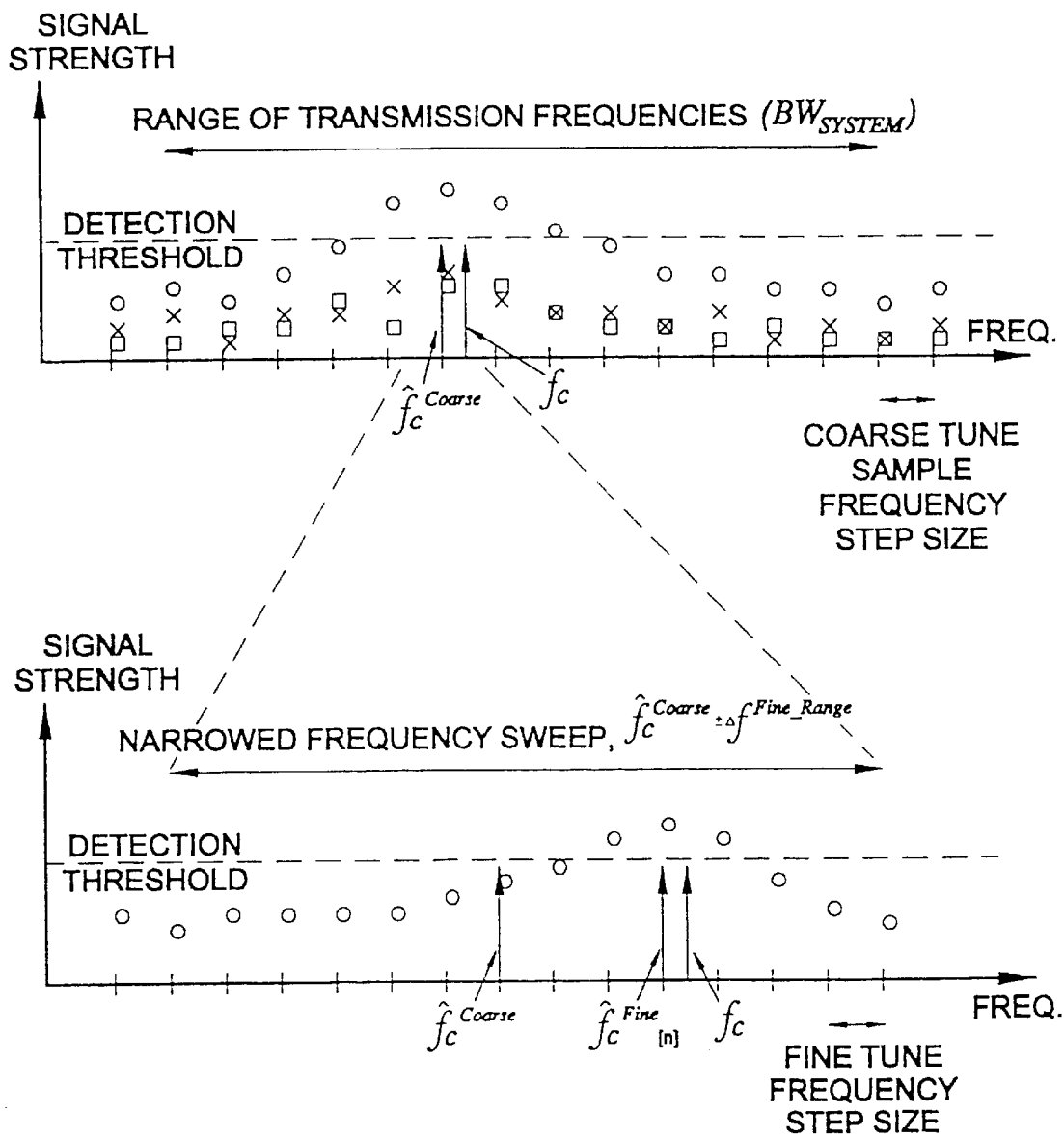
FIG. 4 shows the fine tuning method of the present invention.

FIG. 4 shows how the Fine Tune algorithm focuses on a narrowed frequency sweep about the coarse frequency estimate determined during the Search/Coarse Tune function. The narrowed frequency sweep's range, $\pm\Delta f^{Fine\_Range}$, is selected to optimize between maximizing the probability of enclosing the true frequency and minimizing the time spent searching for the true frequency. Widening the range increases the probability of enclosing the true frequency, but increases the search time.

The fine tune method performs one sweep over the narrowed frequency range using smaller frequency steps. The frequency steps were selected smaller than $f_d/2$ to assure that at least one frequency step falls within the pull-in range of the DSSS receiver's AFC loop. A frequency estimate is determined by finding the largest RSS value, if any exist, that crosses a defined threshold. Multiple sweeps are performed to estimate multiple fine frequency estimates, where n is the $n^{th}$ frequency estimate. These estimates are averaged to obtain a final frequency estimate. Averaging multiple individual estimates improves the accuracy and resolution of the individual estimates. The final frequency estimate can have fractional Fine Tune Frequency Step sizes while the individual estimate's resolution is limited to the step size. Although the DSSS receiver is able to demodulate any signal that transmits within its frequency pull-in range, its performance worsens as signal frequencies near the limits. Therefore, obtaining resolution finer than the frequency step size is beneficial.

Increasing the number of sweeps, which is greater than or equal to the number of estimates, increases the time required for the Fine Tune function. Therefore, the right trade must be made between maximizing frequency accuracy and minimizing function operational time.

Demodulation Algorithm

When a signal is detected and the transmission frequency estimated, the receiver starts demodulating the transmission. For the receiver to correctly decode the message, the burst transmission must still be in the Preamble (see FIG. 1) part of the burst. The demodulation algorithm must have time to verify the Preamble prior to entering the Frame Sync part of the burst.

Verification

At this point the frequency should be accurately estimated, but it is still possibly in error. However, the error should be relatively small. The verification function attempts to demodulate at several nearby frequencies before giving up and starting over. It determines whether too many bit errors occur at the first frequency estimate. If too many occur, it tunes to a new frequency that is slightly greater, by $\Delta f^{Verify}$, than the original estimate, $\hat{f}_c^{FINE}$, and again tries demodulating the Preamble. If too many bit errors occur at the new frequency it tunes to a new frequency $\Delta f^{Verify}$ below the original estimate and again tries demodulating the Preamble. If it fails again, it tunes to a new frequency that is $2\Delta f^{Verify}$ greater than the original estimate. It continues trying new frequencies, working away from the original estimate, until either it demodulates the bit stream with few bit errors or it reaches a preset limit for number of re-tunes. If it reaches the present limit for attempts, the receive algorithm reverts back to attempting to acquire a burst.

When the receiver is tuned to a frequency where it is able to demodulate Preamble bits with few bit errors, it continues demodulation of the Preamble until the input bits match the Frame Sync. If too many Preamble bits are demodulated, the algorithm fails and reverts to searching for a new burst.

Once the Frame Sync is recognized by the algorithm, it aligns the bit retrieval on byte boundaries and signals the algorithm that the following bytes are Message Data bytes. If any bit error occurs in the Frame Sync, the algorithm reverts to searching for a new burst. In this application the Frame Sync was three bytes long.

The first piece of information demodulated is the message type and its error code. The algorithm demodulates this information and determines the length of the message being received from a look up table. This information is used by the algorithm to know when to stop demodulating data. If an error occurs in demodulating the message type or its error code, the algorithm fails and reverts to searching for a new burst.

If the message type and its error code are correctly demodulated, the algorithm continues demodulating data until the entire message is received. Since this algorithm is implemented in limited hardware, it passes bytes as they are received to another processor for further processing. The limited hardware is unable to store an entire message in its memory. Therefore, error code checking is not performed on the entire message in this algorithm.

Appendix A: STEL-2000 Register Programming

The STEL-2000 Direct Sequence Spread Spectrum (DSSS) receiver/transmitter chip's registers must be correctly programmed for a receiver algorithm to function properly. This appendix discusses the programming of the STEL-2000 registers for the application. This discussion assumes some familiarity with the STEL-2000 receiver/transmitter chip.

Certain key design parameters must be known to properly program the STEL-2000 for a given application. These parameters and the values applicable for the RF Identification program are listed below. Many other parameters must be known as well. These parameters will simply be indicated by the programming values later.

TABLE 1

Key Parameters Required for Proper STEL-2000 Programming

| Parameter | RF Identification Project |
| --- | --- |
| Receiver Bandwidth | 1.25 to 5.25 MHz |
| A/D Sample Rate | 20 MHz |
| Peak Input (in LSB) | 102 |
| $N_o$, number of samples per half PN chip | 20 |
| M, number of PN chips per data symbol | 15 (60 - in Fine Tune mode) |
| PN Sequence (per data bit) | $110101100100011_{LSB}$ (lsb sent first) |
| Preamble Data bit pattern | $1000_{LSB}$ (lsb sent first) |

Programming the Stel receiver is somewhat tricky. Changing a register's value early in the block diagram can cause improper operation if the values selected for following registers are not readjusted. Table 2 shows how the register values depend upon one another. The list following the table mentions specifics about each point in the block diagram shown in FIG. 5. Each letter (e.g., A, B, etc.) represents a point in the block diagram. Note that two sets of numbers may be listed in this table. The two sets reflect the two different length PN Codes that may be used in the acquisition part of the receiver tuning algorithm.

TABLE 2

Stel-2000 Register Value Calculations

| View Port | Ref. Point | Value (Expr.) | Value (Numeric) | Value (LSBs) | Constraint | Register Program |
|---|---|---|---|---|---|---|
| | V(A) | $0.8 \times 2^7$ | $0.8 \times 2^7$ | 102.4 | | |
| | V(B) | $V(A) \times 2^7$ | $0.8 \times 2^{14}$ | 13107.2 | | |
| | V(C) | $V(B) \times 2^{Log_2 H}$ | $0.8 \times 2^{14+4.32}$ | 262144 | | $02_H$: 0x13 |
| | V(D) | $V(C) \times 2^{-8}$ | $0.8 \times 2^{6+4.32}$ | 1024 | | |
| ---> | V(E) | $V(D) \times 2^{-VP\_DC}$ | $2^{-0.32+6+4.32-VP\_DC} = 2^1$ | 2(9), 4(8) | <=3.5 ($2^{1.81}$) | $01_H$: 0x9?, 0x8? would cause clipping |
| | V(F) | $V(E) \times 2 Log_2 M$ | $2^{1+3.91}, 2^{1+5.91}$ | 30(15), 120(60) | M=15, 60 | $2D_H$:0x0e, 0x3b |
| | V(G) | V(F) | $2^{4.91}, 2^{6.91}$ | 30(15), 120(60) | | 29, 2A, 2B, $2C_H$:0x20,0x50 |
| ---> | V(H) | $V(G) \times 2^{-VP\_MP}$ | $2^{4.91(6.91)-VP\_MF}$ | 30(15), 60(60) | <=100 ($2^{6.64}$) | $28_H$0x?0 (15), 0x?1 (60) |
| | V(I) | $V(H)^2 \times 0.6$ | $0.6 \times 2^{2\times 4.91(6.91)-0(1)}$ | 540(15), 2160(60) | | |
| ---> | V(J) | $V(I) \times 2^{-VP\_AFC}$ | $2^{-0.74+2\times[4.91(6.91)-0(1)]-VP\_AFC}$ | 67.5(15), 67.5(60) | <=128 ($2^7$) | $33_H$:0x3? (15), 0x5? (60) |
| | V(K) | V(J) | $2^{-0.74+2\times[4.91(6.91)-0(1)]-3(5)}$ | 67.5 | | $34_H$: 0x0b |
| | V(L) | $K_2 \times V(K)$ | $K_2 \times 2^{-0.74+2\times 4.91-3}$ | 742.5 | | |
| | V(M) | | | | | |
| | V(N) | V(M) | | | | |
| | V(O) | $V(N) \times 2^{-2}$ | | | <=$2^{31}$ | |
| | V(P) | V(O) | | | | |
| | V(Q) | V(P) | | | | |
| | V(R) | V(Q) | | | | |
| | V(S) | $2^7$ | $2^7$ | | | |

Figure 5:
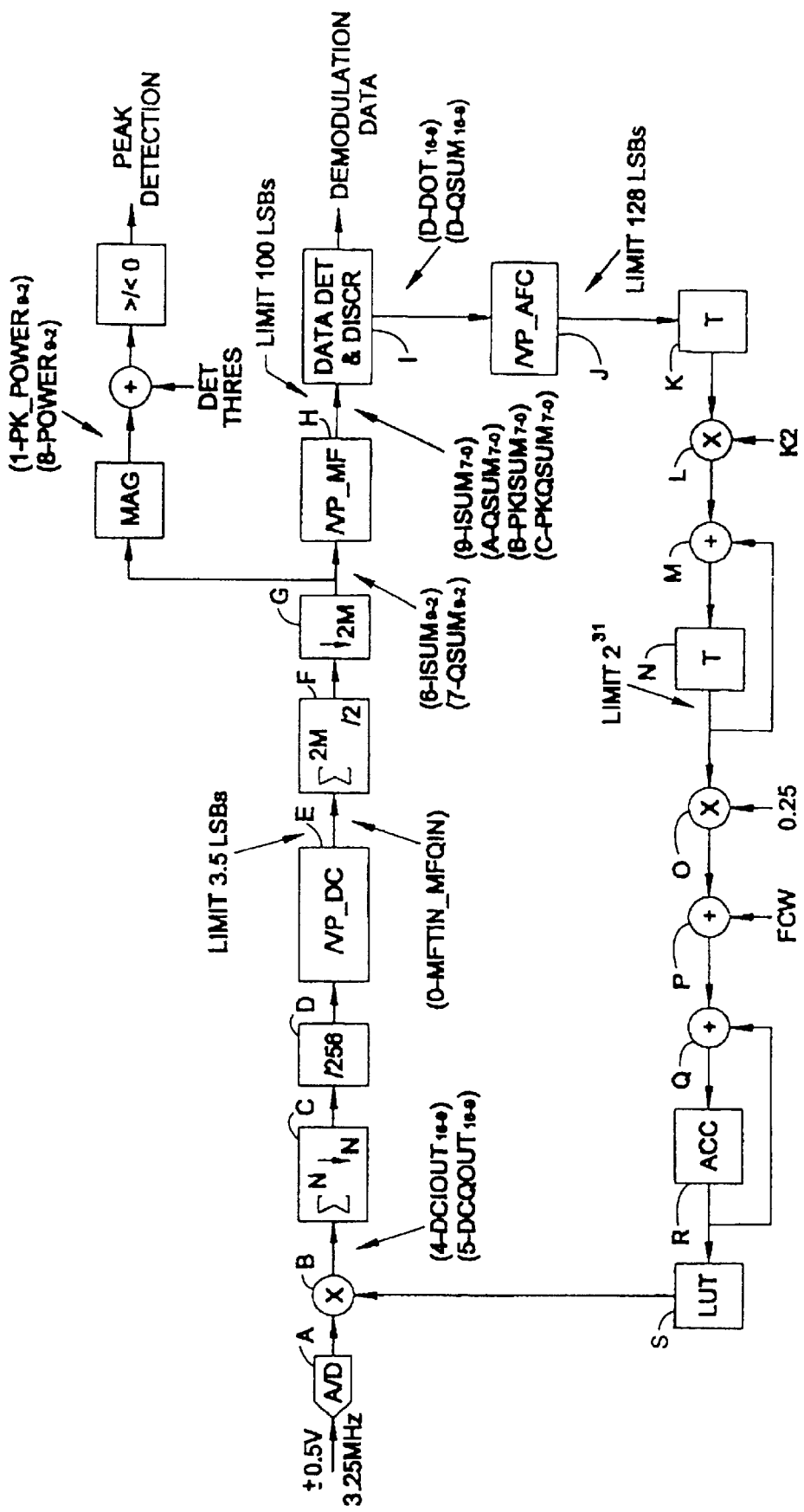
FIG. 5 shows a block diagram of the single chip direct sequence spread spectrum receiver of the present invention.

Critical Point Description (FIG. 5)

A: The A/D accepts input signals with variation of up to +/−0.5V. It converts @20 MHz (40×DSSS Chip Rate, $N_o$=20, $02_H$ set to $13_H$). Its output is offset binary ($01_H$ bit 3 set to $0_H$).

C: The number of samples per half chip is set in reg $02_H$ to $13_H$.

E: The Integrate and Dump viewport is set in reg $01_H$ bits 7-4 to $9x_H$ (or possibly $8x_H$). This is described in the Spread Spectrum Development Kit pgs 66–67.

F: The number of chips per data symbol is set in reg $2D_H$ bits 5-0 to $0e_H$ (for 15 chips per symbol) or to $3b_H$ (for 60 chips per symbol).

G: The detection threshold is set in regs $29_H$ and $2A_H$ to $0e_H$ (for 15 chips per symbol) or to $0e_H$ (for 60 chips per symbol). This is described in the Spread Spectrum Development Kit pgs 68–69.

H: The Matched Filter viewport is set in reg $28_H$ to $00_H$ (for 15 chips per symbol) or to $00_H$ (for 60 chips per symbol). This is described in Spread Spectrum Development Kit pg 67.

J: The AFC viewport is set in reg $33_H$ bits 7-4 to $0e_H$ (for 15 chips per symbol) or to $0e_H$ (for 60 chips per symbol). This is described in Spread Spectrum Development Kit pgs 74–76.

L: The $K_2$ loop gain factor is set in reg $34_H$ bits 4-0 to $0e_H$. This is described in the Spread Spectrum Development Kit pgs 78–79.

Once the correct values are determined for the Stel receiver, they must be programmed into the Stel's registers. Table 3 lists the values selected for various modes of the receiver acquisition/demodulation algorithm. Three modes are listed: 1) Search (coarse tune), 2) Fine Tune, and 3) Demodulation. Listed in parenthesis are the values programmed in the Wescorp alpha stage. Just preceding each mode column is a column with 'x's, '?'s and blank spaces. The rows marked with 'x's represent the registers that must be programmed for the given mode (even though others may also be programmed). The '?'s may not require programming, but this has not yet been tested. Table 3 STEL-2000 Register Settings (Values in ( ) are from original asm code. The listing is in the order the values should be programmed.)

TABLE 3

| Register | Search | Fine Tune* | Demod** | Description |
|---|---|---|---|---|
| $37_H$ | x $03_H$ ($00_H$) | x 00H ($00_H$) | x $00_H$ | Bit 0-NCO Enable<br>Bit 1-Transmitter Enable<br>Bit 2-Receiver Enable |
| $37_H$*** | x $07_H$ ($05_H$) | x $07_H$ ($05_H$) | x $03_H$ ($07_H$) | Downconverter Registers |
| $00_H$ | $00_H$ ($00_H$) | x $00_H$ ($00_H$) | $00_H$ ($00_H$) | Bit 0 - Frequency Control Word Load |
| $01_H$ | x $80_H$ ($80_H$) | x $80_H$ ($80_H$) | x $80_H$ ($80_H$) | (Rising edge loads word.) |
| | | ($80_H$) | | Bit 0 - Manual Sample Control<br>Bit 1 - Invert Loop Filter Value<br>Bit 2 - NCO Accumulator Carry In<br>Bit 3 - Two's Complement Input<br>Bits 7-4 - Integrate and Dump VP Control<br>Bits 5-0 - Receiver Baseband Sampling |
| $02_H$ | x $13_H$ ($13_H$) | x $13_H$ | x $13_H$ ($13_H$) | Bits 7-0-NCO FCW Word |

TABLE 3-continued

| Register | Search | Fine Tune* | Demod** | Description |
|---|---|---|---|---|
| 03$_H$ | 00$_H$ (00$_H$) | (13$_H$) 00$_H$ (00$_H$) | 00$_H$ (00$_H$) | |
| 4$_H$ | 00$_H$ (00$_H$) | 00$_H$ | 00$_H$ (00$_H$) | Bits 15-8-NCO FCW Word |
| 05$_H$ | 00$_H$ (00$_H$) | (00$_H$) 00$_H$ | 00$_H$ (00$_H$) | Bits 23-16-NCO FCW Word |
| 06$_H$ | 00$_H$ (00$_H$) | (00$_H$) 00$_H$ | 00$_H$ (00$_H$) | Bits 31-24-NCO FCW Word |
| | | (00$_H$) | | PN Matched Filter Registers Tap Bits 1,0   Tap Coef x 0             0 0 1           + 1 1 1           − 1 Addr 07$_H$ - 16$_H$ are Acq/Preamble Coef Addr 16$_H$ Bits 7,6 - Coef 63: Bits 5,4 - Coef 62; Bits 3,2 - Coef 61; Bits 1,0 - Coef 60; . . . Addr 07$_H$ Bits 7,6 - Coef3;Bits 5,4 - Coef 2; Bits 3,2-Coef 1; Bits 1,0 - Coef 0; |
| 07$_H$ | x 75$_H$ (75$_H$) | x DF$_H$ (DF$_H$) | x 75$_H$ (DF$_H$) | |
| 08$_H$ | x D7$_H$ (D7$_H$) | (DF$_H$) x 7D$_H$ | x D7$_H$ (7D$_H$) | |
| 09$_H$ | x F7$_H$ (F7$_H$) | (7D$_H$) | x F7$_H$ (5D$_H$) | |
| 0A$_H$ | x 17$_H$ (17$_H$) | x 5D$_H$ (FD$_H$) | x 17$_H$ | |
| 0B$_H$ | x 00$_H$ (00$_H$) | (5D$_H$) x FD$_H$ | x 00$_H$ (77$_H$) | |
| 0C$_H$ | x 00$_H$ (00$_H$) | (FD$_H$) | x 00$_H$ (5F$_H$) | |
| 0D$_H$ | x 00$_H$ (00$_H$) | x 77$_H$ | x 00$_H$ (57$_H$) | |
| 0E$_H$ | x 00$_H$ (00$_H$) | (77$_H$) x 5F$_H$ | x 00$_H$ (FF$_H$) | |
| 0F$_H$ | x 00$_H$ (00$_H$) | (5F$_H$) | x 00$_H$ (DD$_H$) | |
| 10$_H$ | x 00$_H$ (00$_H$) | x 57$_H$ | x 00$_H$ (D7$_H$) | |
| 11$_H$ | x 00$_H$ (00$_H$) | (57$_H$) x FF$_H$ | x 00$_H$ (D5$_H$) | |
| 12$_H$ | x 00$_H$ (00$_H$) | (FF$_H$) | x 00$_H$ (D7$_H$) | |
| 13$_H$ | x 00$_H$ (00$_H$) | x DD$_H$ | x 00$_H$ (5D$_H$) | |
| 14$_H$ | x 00$_H$ (00$_H$) | (DD$_H$) x D7$_H$ | x 00$_H$ (DF$_H$) | |
| 15$_H$ | x 00$_H$ (00$_H$) | (D7$_H$) | x 00$_H$ (5F$_H$) | |
| 16$_H$ | x 00$_H$ (00$_H$) | x D5$_H$ | x 00$_H$ (00$_H$) | |
| | | (D5$_H$) x D7$_H$ (D7$_H$) x 5D$_H$ (5D$_H$) x DF$_H$ | | |
| | | (DF$_H$) x 5F$_H$ | | Addr 17$_H$ - 26$_H$ are Data Coef Addr 26$_H$ Bits 7,6 - Coef 63; Bits 5,4 - Coef 62; Bits 3,2 - Coef 61; Bits 1,0 - Coef 60; . . . Addr 17$_H$ Bits 7,6 - Coef3; Bits 5,4- Coef2; Bits 3,2 - Coef1; Bits 1,0- Coef0; |
| | | (5F$_H$) 00$_H$ (00$_H$) | | |
| 17$_H$ | x 75$_H$ (75$_H$) | DF$_H$ | x 75$_H$ (75$_H$) | |
| 18$_H$ | x D7$_H$ (D7$_H$) | (DF$_H$) 7D$_H$ | x D7$_H$ (D7$_H$) | |
| 19$_H$ | x F7$_H$ (F7$_H$) | (7D$_H$) | x F7$_H$ (F7$_H$) | |
| 1A$_H$ | x 17$_H$ (17$_H$) | 5D$_H$ | x 17$_H$ (17$_H$) | |
| 1B$_H$ | x 00$_H$ (00$_H$) | (5D$_H$) FD$_H$ | x 00$_H$ (00$_H$) | |
| 1C$_H$ | x 00$_H$ (00$_H$) | (FD$_H$) | x 00$_H$ (00$_H$) | |
| 1D$_H$ | x 00$_H$ (00$_H$) | 77$_H$ | x 00$_H$ (00$_H$) | |
| 1E$_H$ | x 00$_H$ (00$_H$) | (77$_H$) 5F$_H$ | x 00$_H$ (00$_H$) | |
| 1F$_H$ | x 00$_H$ (00$_H$) | (5F$_H$) | x 00$_H$ (00$_H$) | |
| 20$_H$ | x 00$_H$ (00$_H$) | 57$_H$ | x 00$_H$ (00$_H$) | |
| 21$_H$ | x 00$_H$ (00$_H$) | (57$_H$) FF$_H$ | x 00$_H$ (00$_H$) | |
| 22$_H$ | x 00$_H$ (00$_H$) | (FF$_H$) | x 00$_H$ (00$_H$) | |
| 23$_H$ | x 00$_H$ (00$_H$) | DD$_H$ | x 00$_H$ (00$_H$) | |
| 24$_H$ | x 00$_H$ (00$_H$) | (DD$_H$) D7$_H$ | x 00$_H$ (00$_H$) | |
| 25$_H$ | x 00$_H$ (00$_H$) | (D7$_H$) | x 00$_H$ (00$_H$) | |
| 26$_H$ | x 00$_H$ (00$_H$) | D5$_H$ | x 00$_H$ (00$_H$) | Bit 0 - Front End Processor Disable |
| 27$_H$ | x 00$_H$ (00$_H$) | (D5$_H$) D7$_H$ | x 00$_H$ (00$_H$) | |
| 28$_H$ | x 00$_H$ (00$_H$) | (D7$_H$) 5D$_H$ | x 00$_H$ (00$_H$) | Power Estimator Registers Bits 1-0 - Matched Filter VP Control |
| 29$_H$ | x 20$_H$ (30$_H$) | (5D$_H$) DF$_H$ | x 24$_H$ (80$_H$) | Acquisition and Tracking Processor Registers |
| 2A$_H$ | x 00$_H$ (00$_H$) | (DF$_H$) | x 00$_H$ (00$_H$) | |
| 2B$_H$ | x 20$_H$ (30$_H$) | 5F$_H$ | x 20$_H$ (08$_H$) | Bits 7-0 - Acq/Preamble Thres bits 7-0 |
| 2C$_H$ | x 00$_H$ (00$_H$) | (5F$_H$) 00$_H$ | x 00$_H$ (00$_H$) | |
| 2D$_H$ | x 0E$_H$ (0E$_H$) | (00$_H$) | x 0E$_H$ (0E$_H$) | Bits 1-0 - Acq/Preamble Thres bits 9-8 |
| 2E$_H$ | x 4C$_H$ (4C$_H$) | x 00$_H$ | x 03$_H$ (4C$_H$) | |
| 2F$_H$ | x FF$_H$ (FF$_H$) | (00$_H$) | x 08$_H$ (FF$_H$) | Bits 7-0 - Data Symbol Thres bits 7-0 |
| 30$_H$ | x 60$_H$ (60$_H$) | 00$_H$ (00$_H$) x 80$_H$ (80$_H$) x 00$_H$ (00$^H$) 80$_H$ | x 44$_H$ (60$_H$) | Bits 1-0 - Data Symbol Thres bits 9-8 Bits 5-0 - Rx Chips per Data Symbol +1 Receiver Data Symbols per Burst Threshold |
| 31$_H$ | x 00$_H$ (00$_H$) | x 00$_H$ | x 00$_H$ (00$_H$) | |
| 32$_H$ | x 00$_H$ (00$_H$) | (00$_H$) x 00$_H$ (00$_H$) | x 00$_H$ (00$_H$) | Bit 0 - Receiver Manual Abort Demodulator Registers |
| 33$_H$ | x 10$_H$ (10$_H$) | 20$_H$ | 00$_H$ (00$_H$) | Bits 1-0-Signal Rotation Control Bit 2-Not used (must be set to 0) |
| 34$_H$ | x 00$_H$ (00$_H$) | (40$_H$) | x 68$_H$ (2B$_H$) | Bit 3- Loop Clear Disable Bits 7-4-AFC VP Control Bits 4-0-K2 Gain Value |
| 35$_H$ | x 00$_H$ (00$_H$) | 00$_H$ (00$_H$) | 00$_H$ (00$_H$) | Bit 5 - K2 On Bit 6-Freeze Loop Output Processor Control |

TABLE 3-continued

| Register | Search | Fine Tune* | Demod** | Description |
|---|---|---|---|---|
| 36$_H$ | x 02$_H$ (02$_H$) | 00$_H$ | 02$_H$ (02$_H$) (00$_H$) | Registers Bit 0 - Reverse I and Q Bit 1 - BPSK Enable |
| 38$_H$ | x 01$_H$ (01$_H$) | | x 01$_H$ (01$_H$) | Bit 2 - Invert Output Bits 3-0 - RXTEST Function |
| 39$_H$ | x 00$_H$ (00$_H$) | 02$_H$ | x 7C$_H$ (00$_H$) | Select |
| 3A$_H$ | x 00$_H$ (1D$_H$) | (02$_H$) | x 00$_H$ (1D$_H$) | Bits 6-0 - Matched Filter Power |
| 3B$_H$ | x 00$_H$ (00$_H$) | x 01$_H$ (01$_H$) x 00$_H$ (00$_H$) 1D$_H$ (1D$_H$) x 00$_H$ (00$_H$) | x 00$_H$ (00$_H$) | Saver Receiver Data Symbols per Burst (bits 15-8)

Bit 0 - Matched Filter Loopback Enable Bit 1 - IF Loopback Enable Bit 3-2 - Receiver Overlay Select Addr 3 C$_H$ thru 3F$_H$ unused Transmit Control Register |
| 40$_H$ | x 03$_H$ (03$_H$) | 03$_H$ | x 03$_H$ (03$_H$) | Bit 0 - Transmit BPSK Bit 1 - Offset Binary Output Bit 2 - Manual Chip Clock Enable Bit 3 - Invert Symbol Bits 5-0 - TXIFCLK Cycles per Chip |
| 41$_H$ | x 3F$_H$ (3F$_H$) | 3F$_H$ | x 3F$_H$ (3F$_H$) | |
| 42$_H$ | x 0E$_H$ (0E$_H$) | (3F$_H$) | x 0E$_H$ (0E$_H$) | Bits 5-0-Tx Chips per Data Symbol |
| 43$_H$ | x 0E$_H$ (0E$_H$) | 0E$_H$ (0E$_H$) 0E$_H$ (0E$_H$) | x 0E$_H$ (0E$_H$) | Bits 5-0-Tx Chips per Acq/Preamble Addr 44$_H$-4B$_H$ are Transmitter Acq/Preamble Symbol Code Addr 4B$_H$ Bits 7-0 - Code bits 63-56 . . . Addr 44$_H$ Bits 7-0 - Code bits 7-0 |
| 4C$_H$ | x 00$_H$ (00$_H$) | 00$_H$ | x 00$_H$ (00$_H$) | |
| 4D$_H$ | x 00$_H$ (00$_H$) | (00$_H$) 00$_H$ | x 00$_H$ (00$_H$) | |
| 4E$_H$ | x 00$_H$ (00$_H$) | (00$_H$) | x 00$_H$ (00$_H$) | |
| 4F$_H$ | x 00$_H$ (00$_H$) | 00$_H$ | x 00$_H$ (00$_H$) | |
| 50$_H$ | x 00$_H$ (00$_H$) | (00$_H$) 00$_H$ | x 00$_H$ (00$_H$) | |
| 51$_H$ | x 00$_H$ (00$_H$) | (00$_H$) | x 00$_H$ (00$_H$) | |
| 52$_H$ | x 00$_H$ (00$_H$) | 00$_H$ | x 00$_H$ (00$_H$) | |
| 53$_H$ | x 00$_H$ (00$_H$) | (00$_H$) 00$_H$ | x 00$_H$ (00$_H$) | |
| 54$_H$ | x 00$_H$ (00$_H$) | (00$_H$) | x 00$_H$ (00$_H$) | |
| 55$_H$ | x 00$_H$ (00$_H$) | 00$_H$ | x 00$_H$ (00$_H$) | Bits 1-0 - Transmitter Overlay |
| 56$_H$ | x 00$_H$ (00$_H$) | (00$_H$) 00$_H$ (00$_H$) 00$_H$ (00$_H$) 00$_H$ (00$_H$) 00$_H$ (00$_H$) | x 00$_H$ (00$_H$) | Select Bit 2 - Transmitter Symbols Per Burst off (Must always be set to 0) Transmitter Data Symbols per Burst (bits 7-0) Transmitter Data Symbols per Burst (bits 15-8) |

*See section on programming PN Code. [Note: Although still listed here, the Fine Tune no longer requires separate STEL-2000 register programming it no longer uses a different PN Code from the other modes.]
**The register programming for the Demod mode must be immediately followed with the following additional sequence { (0x37,0x07), wait 200 μs, (0x30,0x60 - permit transition from acquisition to demodulation), wait 200 μs, (0x30,0x04 - permit resets on too many errors), wait 200 μs, (0x30,0x60 - disable resets) }
***Although this register is programmed to enable the transmit section of the STEL-2000, disabling the transmit section has been noted to reduce the receiver's noise floor ~5 dB. This should be investigated further if additional sensitivity is desired.

Whenever the Stel is tuned to a new frequency, a sequence of registers must be programmed. Table 4 describes the sequence that is used.

TABLE 4

STEL-2000 Register Settings Sequence for Tuning

| Register | Search | Description |
|---|---|---|
| 05$_H$ | freq_low_byte | Bits 23–16 - NCO FCW Word |
| 06$_H$ | freq_high_byte | Bits 31–24 - NCO FCW Word |
| 00$_H$ | 01$_H$ (01$_H$) | Bit 0 - Frequency Control Word Load (Rising edge loads word.) |
| 00$_H$ | 00$_H$ (00$_H$) | Bit 0 - Frequency Control Word Load (Rising edge loads word.) |
| 32$_H$ | 01$_H$ (01$_H$) | Bit 0 - Receiver Manual Abort |
| 32$_H$ | 00$_H$ (00$_H$) | Bit 0 - Receiver Manual Abort |

Programming PN Code

[Note: The Fine Tune mode no longer uses a different PN Code from that of the other modes.]

The PN code programming is somewhat tricky. The following description is based on the Z2000 Spread-Spectrum Transceiver Data Book pgs 1-11, 1-24 & 25, and 1-35. It is also based on measurements made on the data stream. It is assumed that Tap 0 in FIG. 3 pg 1-11 of the data book is the same as Coeff 0 in Table 9 pg 1-24 of the data book. (From data book pg 1-35: Tap 0 is played last.) Then the following tables can be generated, where Table 5 describes how the register values are generated for the Search and Demodulation modes and Table 6 describes how the register values are generated for the Fine Tune mode.

TABLE 5

STEL-2000 Register PN Code Settings for Coarse Tune

| Time | First | | | | Last |
|---|---|---|---|---|---|
| Preamble | | x | 1 | | |
| Seq. | | xx | 110001001101011 | | |
| PN Seq. (0, 1) | | 0 | 1 1-1-1-1 1-1-1 1 1-1 1-1 1 1 | | |
| PN Seq. (−1, 1) | | 00 | 0101111110111101011101110101 | | |
| PN Filter | | 1 | 7 F 7 D 7 7 5 | | |
| Tap Bits Nibble | | | 17 | F7 D7 | 75 |

TABLE 5-continued

STEL-2000 Register PN Code Settings for Coarse Tune

| Time | First | | | | Last |
|---|---|---|---|---|---|
| Values Reg. Byte | 0A | 09 | 08 | 07 | |
| Values Register Address Coeff | 15 | −12 | 11−8 | 7−4 | 3−0 |

TABLE 6

STEL-2000 Register PN Code Settings for Fine Tune

| TIME | FIRST | | | | | | | | | | | LAST | | | |
|---|---|---|---|---|---|---|---|---|---|---|---|---|---|---|---|
| Preamble Seq. | 0 | | 0 | | | 0 | | | 0 | | | 1 | | | |
| PN Seq. (0, 1) | 0 0 1 1 1 0 1 1 0 0 1 0 1 0 0 | | 0 0 1 1 1 0 1 1 0 0 1 0 1 0 0 | | | 0 0 1 1 1 0 1 1 0 0 1 0 1 0 0 | | | 1 1 0 0 0 1 0 0 1 1 0 1 0 1 1 | | | | | | |
| PN Seq. (−1,1) | −1−1 1 1 1 1−1 1 1−1−1 1−1 1−1−1 | | −1−1 1 1−1 1−1−1 1 1−1 1 1 1 1−1−1 | | | −1−1 1 1 1−1 1 1 1−1−1 1−1 1−1−1 | | | 1 1−1−1−1 1−1 1− 1 1 1−1 1−1 1 1 1 | | | | | | |
| PN Filter Tap Bits | 1111010101110101 11110111011111 | | 111101010111010 111110111011111 | | | 111101010111010 111110111011111 | | | 010111111101111 101011101110101 | | | | | | |
| Nibble Values | F F | 5 7 | 7 7 | 5 F | D D | 5 D | D F | 7 | F F | 5 7 | 7 7 | 5 D | 7 | 7 F | F 5 | 7 D |
| Reg. Byte Values | F5 F7 | | 75 7F | | DD | D5 | D7 FF | | 77 | 57 D7 | | 5F D7 | | | F7 75 | |
| Register Address Coeff | 15 13 59−56 51−48 | 14 12 55−52 47−44 | | 11 0F 43−40 35−32 | | 10 0E 39−36 31− | 0B 28 20 | 0D 0A 27−24 19−16 | | 0C 23− 15 | 08 −12 7−4 | | 09 07 11−8 3−0 | | | |

It is understood that the exemplary method for tuning a spread spectrum receiver described herein and shown in the drawings represents only a presently preferred embodiment of the invention. Indeed, various modifications and additions may be made to such embodiment without departing from the spirit and scope of the invention. Thus, various modifications and additions may be obvious to those skilled in the art and may be implemented to adapt the present invention for use in a variety of different applications.

What is claimed is:

1. A method for tuning a spread spectrum receiver to a frequency of a digital signal within a specified frequency band, the method comprising the steps of:
 a) coarse tuning the receiver while a preamble of the digital signal is being received, the coarse tuning comprising:
  i) dividing the specified frequency band into a plurality of first sub-bands;
  ii) sequentially measuring a received signal strength within each first sub-band until the received signal strength is greater than a predetermined threshold;
 b) fine tuning the receiver while the preamble of the digital signal is being received, the fine tuning comprising:
  i) dividing at least one first sub-band which is found to have the received signal strength greater than a predetermined into a plurality of second sub-bands when the received signal strength is greater than the predetermined threshold;
  ii) sequentially measuring the received signal strength within each second sub-band so as to determine which second sub-band contains a signal having the received signal strength above a predetermined threshold;
  iii) determining which second sub-band contains the signal with the greatest received signal strength; and
 c) demodulating the signal, comprising demodulating the signal in the second sub-band which has the greatest received signal strength.

2. The method as recited in claim 1, wherein the step of sequentially measuring a received signal strength within each first sub-band until a received signal strength is greater than a predetermined threshold comprises averaging a plurality of separate received signal strength measurements within each first sub-band.

3. The method as recited in claim 1, further comprising the step of verifying the second sub-band by demodulating at least a portion of the preamble of the digital signal.

4. A method of tuning a spread spectrum receiver to a frequency of a digital signal within a specified frequency band, the method comprising the steps of:
 a) coarse tuning the receiver, the coarse tuning comprising:
  i) dividing the specified frequency band into a plurality of first sub-bands;
  ii) sequentially measuring a received signal strength within each of first sub-band until a received signal strength is greater than a predetermined threshold;
 b) fine tuning the receiver, the fine tuning comprising:
  i) dividing at least one first sub-band into a plurality of second sub-bands;
  ii) sequentially measuring a received signal strength within each second sub-band containing a signal strength above a predetermined threshold; and determining which second sub-band contains the signal with the greatest received signal strength.

5. The method as recited in claim 4, further comprising:
 a) demodulating frame synchronization data; and
 b) demodulating a message.

6. The method as recited in claim 4, further comprising:
 a) demodulating frame synchronization data;
 b) demodulating a message ID; and
 c) demodulating a message.

7. The method as recited in claim 4, further comprising:
 a) demodulating frame synchronization data;

b) demodulating error correction code;

c) demodulating message length; and d) demodulating a message.

* * * * *